(12) United States Patent
Bhupalam et al.

(10) Patent No.: US 7,486,610 B1
(45) Date of Patent: Feb. 3, 2009

(54) MULTIPLE VIRTUAL ROUTER GROUP OPTIMIZATION

(75) Inventors: Bhaskar Bhupalam, Sunnyvale, CA (US); Arghya Mukherjee, Mountain View, CA (US); Venkatanarayana Muppala, Santa Clara, CA (US); Ian H. Wilson, Edinburgh (GB)

(73) Assignee: Cisco Technology, Inc., San Jose, CA (US)

( * ) Notice: Subject to any disclaimer, the term of this patent is extended or adjusted under 35 U.S.C. 154(b) by 632 days.

(21) Appl. No.: 11/127,502

(22) Filed: May 11, 2005

(51) Int. Cl.
*G01R 31/08* (2006.01)
*H04L 12/66* (2006.01)

(52) U.S. Cl. .................. 370/216; 370/463
(58) Field of Classification Search ........... 370/216, 370/218–219, 220–221, 223–225, 241, 463
See application file for complete search history.

(56) References Cited

U.S. PATENT DOCUMENTS

| | | | |
|---|---|---|---|
| 5,473,599 A | | 12/1995 | Li et al. |
| 6,108,300 A | * | 8/2000 | Coile et al. ............ 370/217 |
| 6,856,591 B1 | * | 2/2005 | Ma et al. .............. 370/216 |
| 7,197,660 B1 | * | 3/2007 | Liu et al. ................ 714/4 |
| 7,209,435 B1 | * | 4/2007 | Kuo et al. .............. 370/219 |
| 2002/0184387 A1 | * | 12/2002 | Yamaya et al. ........ 709/238 |
| 2005/0111352 A1 | * | 5/2005 | Ho et al. ............... 370/219 |

OTHER PUBLICATIONS

U.S. Appl. No. 10/151,798, entitled, "Standby Router Protocol Using Optimal Route Metric", filed May 20, 2002, by Ian Herbert Wilson.
Li et al, RFC 2281, "Cisco Hot Standby Router Protocol", Cisco Systems, Mar. 1998.

* cited by examiner

*Primary Examiner*—Kwang B. Yao
*Assistant Examiner*—Candal Elpenord
(74) *Attorney, Agent, or Firm*—Weaver Austin Villeneuve & Sampson LLP (57) ABSTRACT

Methods and apparatus to transition between four states that include a new state, a listening state, a standby state, and an active state. A router includes a plurality of virtual ports. The virtual ports include a master virtual port and one or more client virtual ports. In general, a selected one of the transitions is initiated after occurrence of an event, wherein the initiating of the selected transition is performed only with respect to the master virtual port. When a selected one of the transitions is initiated with respect to the master virtual port of the router, the selected transition is mimicked with respect to the one or more client virtual port(s) of the router.

21 Claims, 5 Drawing Sheets

MULTIPLE VIRTUAL ROUTER GROUP OPTIMIZATION

BACKGROUND OF THE INVENTION

The present invention relates to generally to network systems using redundant or standby router devices working together in a redundancy group to provide a virtual router service. More particularly, it relates to mechanisms for virtual routers within a redundancy router service that also implements virtual ports or sub interfaces on the router devices.

Virtual router protocols such as HSRP (Hot Standby Router Protocol) and VRRP (Virtual Router Redundancy Protocol) are used to provide a redundant router service on a subnet. Typically, two or more routers participate in the election of a router that is responsible for forwarding traffic sent to the virtual router. If that router (or interface) fails then another member of the group will take its place and continue to forward traffic sent to the virtual router.

Increasingly, many hundreds of virtual ports or sub-interfaces are being configured on the same physical interface of a router, with each sub-interface having its own virtual router group. Each virtual port is typically configured to communicate with its peers in the same virtual router group. The negotiation and maintenance of multiple virtual routers each having multiple virtual ports can have a detrimental impact on network traffic and CPU utilization.

In view of the above, there is a need for mechanisms for managing redundant router groups where each router can have multiple virtual ports or sub-interfaces.

SUMMARY OF THE INVENTION

Accordingly, the present invention includes mechanisms for managing redundant router groups that implement interface virtualization. In general, techniques are implemented in a router for transitioning between four states (new, listening, standby, and active) so that only a master virtual port of such router initiates any of the transitions while other client virtual port(s) of the router mimic the transitions initiated by the master virtual port. In further aspects, each of the routers of a redundant router group are configured with these techniques so that they then work together to provide a redundant router service.

In one embodiment, a method implemented in a router for transitioning between states for use in a redundant router group is disclosed. A plurality of virtual ports are provided in a router. The virtual ports include a master virtual port and one or more client virtual ports. A selected one of the transitions is initiated after occurrence of an event. The initiating of the selected transition is performed only with respect to the master virtual port. When a selected one of the transitions is initiated with respect to the master virtual port of the router, the selected transition is mimicked with respect to the one or more client virtual port(s) of the router.

In a specific implementation, initiating a selected one of the transitions after occurrence of an event is accomplished by transitioning from a standby state to an active state after it is determined that either an active peer issues a resign message or stops sending hello messages. In another aspect, initiating a selected one of the transitions after occurrence of an event is accomplished by transitioning from a new state to a standby state after it is determined that an active or standby peer is continuing to send hello messages, a resign message has been received, and a non-active peer does not have a higher priority. In a further aspect, hello messages are sent after it is determined that an active or standby peer has stopped sending hello messages and a resign message has been received. In yet a further embodiment, the sending of hello messages is stopped when it is determined that a non-active peer has a higher priority.

In another implementation aspect, initiating a selected one of the transitions after occurrence of an event is accomplished by transitioning from a new state to an active state after it is determined that an active peer has a lower priority than the current router and the current router is configured to preempt, wherein the transitioning occurs after a coup message is sent and a resign message is received from the active peer. In yet another embodiment, initiating a selected one of the transitions after occurrence of an event is accomplished by transitioning from a new state to an active state after it is determined that (i) an active peer has a lower priority than the current router, (ii) the current router is not configured to preempt, (iii) a standby state has been reached, and (iv) an active peer has failed.

In another embodiment, the invention pertains to a router operable to transition between states for use in a redundant router group. The router includes one or more processors and one or more memory. The one or more processors and memory are configured for (i) providing a plurality of virtual ports in the router, wherein the virtual ports include a master virtual port and one or more client virtual ports, (ii) initiating a selected one of the transitions after occurrence of an event, wherein the initiating of the selected transition is performed only with respect to the master virtual port, and (iii) when a selected one of the transitions is initiated with respect to the master virtual port of the router, mimicking the selected transition with respect to the one or more client virtual port(s) of the router. They may also be configured for performing any combination of the above described method operations.

In an alternative embodiment, a network segment providing a redundant routing capability is disclosed. The network segment includes a first host on a first virtual local area network (VLAN), said host being configured to address data packets to a virtual router and a second host on a second virtual local area network (VLAN), said host being configured to address data packets to the virtual router. The segment further includes at least two physical routers connecting the first and second hosts' VLAN's to at least one other network segment. Each router includes a first virtual port for communicating with the first host and a second virtual port for communicating with the second host, and the first and second virtual ports of each router are configured to initiate transitioning between the states of active and standby router when it is a master port and to merely mimic the transitioning when it is a client port, the active router communicating with the first and second hosts and the standby router backing up the active router.

In specific implementations, each virtual port of each router is configured for (i) transitioning from a standby state to an active state after it is determined that the each virtual port is a master port and after it is determined that either an active peer issues a resign message or stops sending hello messages, (ii) transitioning from a standby state to an active state after it is determined that the master port from the same router has transitioned from a standby state to an active state, (iii) transitioning from a new state to a standby state after it is determined that the each virtual port is a master port and after it is determined that an active or standby peer has stopped sending hello messages, a resign message has been received, and a non-active peer does not have a higher priority, (iv) transitioning from a new state to a standby state after it is determined that the master port from the same router has transitioned from a new state to a standby state, (v) transitioning from a new state to an active state after it is determined that the each virtual port is a master port and after it is determined that an active peer has a lower priority than the current router and the current router is configured to preempt, wherein the transitioning occurs after a coup message is sent and a resign message is received from the active peer, and (vi) transitioning from a new state to an active state after it is determined that the master port from the same router has transitioned from a new state to an active state.

In a specific aspect, each virtual port is further configured for sending hello messages after it is determined that an active or standby peer has stopped sending hello messages and a resign message has been received and the each virtual port is a master port. In another aspect, each virtual port is further configured for stopping the sending of hello messages when it is determined that a non-active peer has a higher priority and the each virtual port is a master port. In a further aspect, each virtual port of each router is configured for transitioning from a new state to an active state after it is determined that the each virtual port is a master port and it is determined that (i) an active peer has a lower priority than the current router, (ii) the current router is not configured to preempt, (iii) a standby state has been reached, and (iv) an active peer has failed.

In another embodiment, a method for providing a redundant routing capability for a plurality of router that each have a plurality of virtual ports. The method includes operations performed for each virtual port of each router. These operations includes (i) transitioning from a standby state to an active state after it is determined that the each virtual port is a master port and after it is determined that either an active peer issues a resign message or stops sending hello messages, (ii) transitioning from a standby state to an active state after it is determined that the master port from the same router has transitioned from a standby state to an active state, (iii) transitioning from a new state to a standby state after it is determined that the each virtual port is a master port and after it is determined that an active or standby peer has stopped sending hello messages, a resign message has been received, and a non-active peer does not have a higher priority, (iv) transitioning from a new state to a standby state after it is determined that the master port from the same router has transitioned from a new state to a standby state, (v) transitioning from a new state to an active state after it is determined that the each virtual port is a master port and after it is determined that an active peer has a lower priority than the current router and the current router is configured to preempt, wherein the transitioning occurs after a coup message is sent and a resign message is received from the active peer, and (vi) transitioning from a new state to an active state after it is determined that the master port from the same router has transitioned from a new state to an active state.

These and other features and advantages of the present invention will be presented in more detail in the following specification of the invention and the accompanying figures which illustrate by way of example the principles of the invention.

DETAILED DESCRIPTION OF SPECIFIC EMBODIMENTS

Reference will now be made in detail to a specific embodiment of the invention. An example of this embodiment is illustrated in the accompanying drawings. While the invention will be described in conjunction with this specific embodiment, it will be understood that it is not intended to limit the invention to one embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

The following description includes examples of a redundant router group implementing Hot Standby Router Protocol (HSRP). However, embodiments of the present invention may be implemented using any suitable redundant router protocol, besides HSRP. By way of example, the Virtual Router Redundancy Protocol (VRRP) may be used. Additionally, although embodiments of the present invention are described herein using a particular virtualization technique, any suitable mechanism may be used to set up and manage virtual networks (e.g., virtual local area networks or VLAN's).

In general, the present invention provides techniques for managing traffic within a redundant router group that has also been configured to implement virtualization. The redundant router group may include any suitable number and type of routers configured to communicate with each other and provide backup for the group while also providing virtual interfaces.

Figure 1:
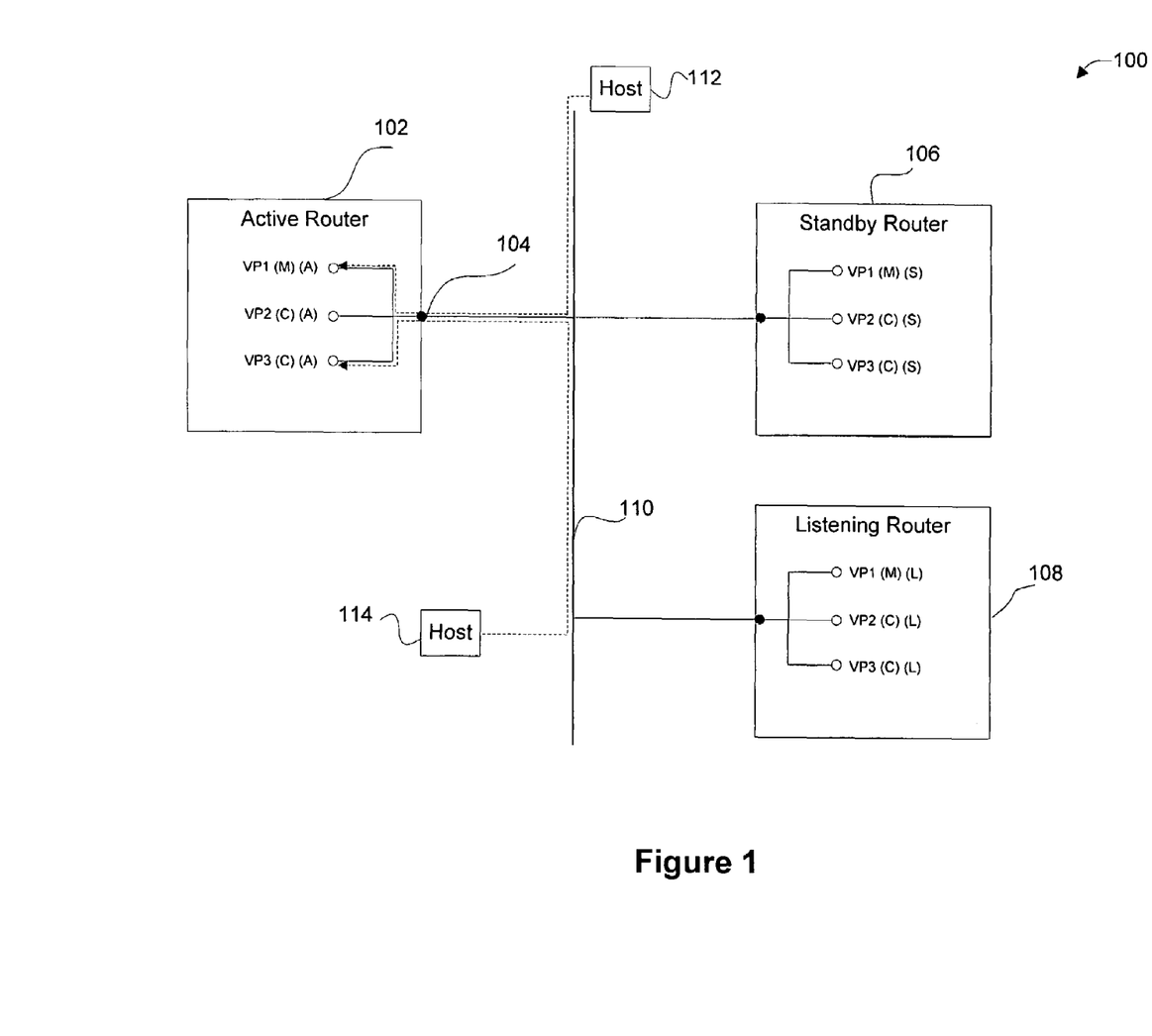
FIG. 1 is a diagrammatic representation of an example network segment in which embodiments of the present invention may be implemented.

FIG. 1 is a diagrammatic representation of an example network segment 100 in which embodiments of the present invention may be implemented. As shown, the network segment 100 includes three routers 102, 106, and 114 and two hosts 112 and 114. The routers and/or hosts may communicate via any suitable link or set of links. The link(s) may be any suitable media such as coaxial cable, shielded and unshielded twisted pair wiring, fiber optic line, radio channels, and the like. The hosts will typically also reside in a LAN (local area network). This LAN may assume a variety of topologies, including ring, bus, star, etc. Further, these LANs may have different physical configurations such as token ring (IEEE 802.5), ethernet (IEEE 802.3), and fiber distributed data interface or "FDDI" (ANSI X3T9.5). As described further below, each host may also belong to a different VLAN (Virtual LAN).

While each router may have a limited number of physical ports, each physical port may be associated with any number of virtual ports for handling traffic from different VLAN's, for example. In one application, a virtual port may be used to broadcast data to hosts residing in its corresponding VLAN.

As shown, physical port 104 of router 102 is associated with three virtual ports VP1, VP2, and VP3. Each virtual port or sub-interface of a particular router is also configured to belong to a particular virtual local area network (VLAN). In the illustrated example, each router has a virtual port VP1 belonging to a first VLAN; a virtual port VP2 belonging to a second VLAN; and a virtual port VP3 belonging to a third VLAN. The virtual ports of each router may be preconfigured in the router or dynamically assigned to the router. The VLAN setup for each virtual port may be recorded or configured using any suitable data structure, such as a table.

Hosts (for example, workstations, users and/or data center servers) using the IP protocol generally are configured to utilize a default gateway to exit a local network and access remote networks. Therefore, each host has prior knowledge of the gateway's IP address which typically is a router or layer-3 switch IP address. Hosts are either statically configured with the IP address of the default gateway or are assigned the address through a configuration protocol (such as Cisco's DHCP) upon boot-up. In either case, the host uses the same default gateway IP address for all network traffic destined to exit the local network. In a network utilizing redundant routers, a host is configured with a particular IP address that that is assigned to the active router. Additionally, each router that implements virtualization is configured to know how to direct the traffic from each host to the appropriate virtual port. For instance, each received packet contains a VLAN identifier which is matched to a particular virtual port. Thus, each host of each VLAN can be said to be in communication with a particular virtual port of the active router. As shown, host 112 communicates with VP1 of router 102, while host 114 communicates with VP3 of router 102. A host is not shown as being in communication with VP2 although this would typically be the case.

The general mechanism of HSRP will now be described in relation to FIG. 1. The transitioning between redundancy states is initially described as being performed by the routers in order to simplify this general discussion of redundancy mechanisms. However, the transitioning is, in fact, performed by the virtual ports of the routers as described further below.

At any one time, one of the routers 102, 106, or 108 assumes the state of active router, a condition requiring that it emulate a virtual router (not shown). Each host 112 and 114 is configured to point to the virtual router, regardless of which real router (102, 106, or 108) is currently emulating it. Thus, when each host 112 or 114 needs to send data packets outside of its LAN, it directs them to its virtual router. A virtual router in this invention is defined by virtual MAC layer and virtual network layer (e.g., IP) addresses which are shared by a group of routers running the protocol of this invention. The router selected by the protocol to be the active router (102, 106, or 108 in this case) adopts these virtual MAC and virtual network layer addresses—possibly in addition to its own addresses—and thus receives and routes packets destined for the group's virtual router. In the router group shown of FIG. 1, there will be 4 pairs of addresses (each pair includes a MAC and a network layer address): one for router 102, one for router 106, one for router 108, and one for the group or virtual router (not shown). As shown, the virtual ports of router 102 are in an active state, which state is denoted by (A) in the figure. The virtual ports of routers 106 are in a standby state, denoted by (S) in the figure. The virtual ports of router 108 are in a listening state, identified with (L) in the figure.

One of the routers in the group (102, 106, or 108) assumes the state of standby (or backup) router. When the standby router detects that the active router has failed, it takes over as the active router by adopting the group's MAC and IP addresses. A new standby router is automatically selected from among the other routers in the group—assuming there are more than two routers in the group. In the simple example provided in FIG. 1, if the router 102 is initially the active router, each host will send packets through router 102 because router 102 has adopted the MAC and network layer addresses of the virtual router. Further, if router 106 is the standby router, a failure by router 102 will cause router 106 to become the active router. After such failure, each host will continue sending data to the MAC and IP addresses of the virtual router even though that data is now transferred though a different router. It is important to recognize that any router in a standby group can assume the roles of standby or active router.

Further, a new router within the group may attempt a coup of the active router if it believes that it meets the conditions necessary to perform as active router. In this case, the new router (e.g., 108) first determines whether it has "priority" over the current active router (explained below). If so, it issues a coup message and the current active router resigns, whereupon the new router takes over the status of active router.

In each of the above examples, the standby group included at least two routers. In preferred embodiments, standby groups include at least three real routers. However, some redundancy can also be obtained with a single router and two interfaces using "dial backup." In this embodiment, one interface is designated a primary interface and the other a backup. When the primary interface fails, the backup interface begins to be used.

The standby protocol of this invention can be run on any of a number of transport protocols including TCP ("Transmission Control Protocol"), UDP ("User Datagram Protocol"), CLNP, and XNS ("Xerox Network System"). Preferably, UDP is used as the transport protocol of this invention.

As noted above, the routers of this invention preferably run on an IP network layer. However, their application is not limited to any specific network layer protocol. For example, the standby protocol of this invention could also run on IPX which is a network layer protocol used underneath "Netware"™ available from Novell, Inc. of Provo, Utah. When the standby protocol of this invention is implemented for IPX, an active router must emulate a virtual IPX router rather than a virtual IP router. Such an active router will be the only router in the group to respond to GNS ("Get Nearest Server") requests issued by hosts.

It should also be recognized that the protocol of this invention can in some circumstances be used to emulate virtual bridges (as opposed to virtual routers). For example, SRB ("source routing bridging") is a protocol allowing for multiple bridges operating in parallel. In implementing this invention in SRB, one bridge from a group would have to emulate a virtual bridge. For example, a virtual bridge number could be employed in much the same manner as the virtual IP addresses used for router standby groups.

When virtualization is implemented in a redundant router group, the virtual ports of the router group are divided into peer groups belonging to the same VLAN. For example, VP1 of router 102, VP1 of router 106, and VP1 of router 108 belong to the same peer group. Likewise, VP2 of each router belongs to the same peer group, and VP3 of each router belongs to the same peer group. Conventionally, each set of virtual port peers are configured to communicate with each other and determine when to transition between different states (e.g., active, standby or listening states). That is, VP1 of router 102, VP1 of router 106, and VP1 of router 108 communicate with each other to determine which router is active and standby; the VP2 set of virtual ports communicate with each to determine who is active and standby; and the VP3 set of virtual ports also determine who is active and standby. Needless to say, this arrangement could lead to a router having virtual ports at different states and uses up a lot of processing and bandwidth resources.

In contrast, embodiments of the present invention allow only a single group of virtual port peers to determine when to transition between different router states. This controlling group is referred to as the master peer group, while the other peer groups are referred to as Client peer groups. The Client peer group(s) transition between states by following what the master peer group does. That is, the master group determines when to transition between states and then performs transitioning when necessary, while the Client groups merely mimic the master group's transition. A particular set of virtual ports of the routers may be designated as belonging to the master group by any suitable data structure mechanism, such as a table. In the example of FIG. 1, the peer group VP1 that is associated with the first VLAN is designated as the master group, denoted by (M), while the peer groups VP2 and VP3 are designated as Client groups, denoted by (C).

In a specific implementation, virtual ports of the master group could be said to enter and leave the network according to a procedure which determines whether an active virtual port of the master group must be replaced, and if so, determines how that port is to be replaced. A virtual port of the master group may leave a network segment in one of two ways: (1) it can simply go down without first notifying the other peers, or (2) it can officially resign by broadcasting its departure. Examples of the first case include a router abruptly losing power, crashing, system reloading, etc. Examples of the second case include scheduled maintenance, etc. Generally, the broadcast resignation is preferable because it allows other peers of the master group in the network to take immediate steps and thereby smooth the transition. A virtual port of the master group which leaves the group can subsequently reenter, but can not immediately assume the role of active or standby. The reentering virtual port will have to await appropriate circumstances before assuming such a role.

To negotiate with one another for the roles of active and standby, the virtual ports of the master group can generally send three types of relevant messages: hello messages, coup messages, and resign messages. Hello messages notifies other peers of the master group in the network that a particular peer is operational in the system. The format of such hello message is generally similar to that of the hello messages used in protocols such as OSPF. Coup messages from local peers of the master group tell active virtual ports that a local peer wishes to take over as the active virtual port (and router). Resign messages tell the other peers that an active peer wishes to leave its post. Sending and receiving of these messages may be performed exclusively by the master virtual ports of such routers although the Client virtual ports may also issue and receive messages. However, only the master virtual ports initiate the transitions between states.

Depending upon the current peer's state and the information contained in each of these messages, a given peer of the master group may or may not change its state. Most generally, the virtual ports of the master group can assume one of three states: new, standby, and active. As will be explained below, a new virtual port of the master group actually resides in one of four substates. Once a virtual port of the master group assumes a particular state, the other virtual ports of Client group from the same router also assume the same role. Thus, the router's virtual port's assume the same state.

Active routers have adopted their group's virtual IP and MAC addresses and therefore handle packets from the group's host that are directed outside of its LAN. The standby router is available to immediately take over as active router (as initiated by the master virtual port on such router) if the current active router should fail or resign. Both active and standby routers issue periodic hello messages to let the other routers on the network know their statuses. New routers may listen for these hello messages and may under some circumstances issue their own hello messages or attempt a coup of the active router.

If an active or standby router fails or otherwise leaves a standby group, it will simply stop sending hello messages. At the end of a defined length of time during which no hello messages are received from the active router, the standby router's master virtual port will initiate taking over the active role. The master virtual ports of the new routers in the segment will then conduct an election to install a new standby router in place of the one that took over as active router. If neither the active router nor the standby router is functioning, the master virtual ports of the new routers will conduct an election to fill both the active and standby slots. In this case, the new router with the highest priority assumes the role of active router and the new router with the second highest priority assumes the role of standby router.

When a standby router receives an active router's resign message (when, for example, it is being taken down for scheduled maintenance), the master virtual port of the standby router automatically assumes the role of active router. At the same time, the master virtual ports of the new routers (having also received the resign message) anticipate that there will not be a standby router and conduct their own election. As a result of the election, a new standby router is installed from among the group of new routers.

As suggested, each router has a specified priority which is used in elections and coups of the active router. A priority may be configured for each router by a user of the network. The priority of each router is preferably an integer between 0 and 255 (i.e., an 8 bit word) with 100 being the default. Generally, the router having the highest priority should be the active router and the router having the second highest priority should be the standby router. When routers enter or leave the network group, the priority-based elections and coups smooth the transition so that the group routers can quickly and with minimal disruption assume their correct status in the system. In the event that two routers having the same priority are seeking the same status, the primary IP addresses of these routers may compared and the router having the higher IP address is given priority.

Figure 2:
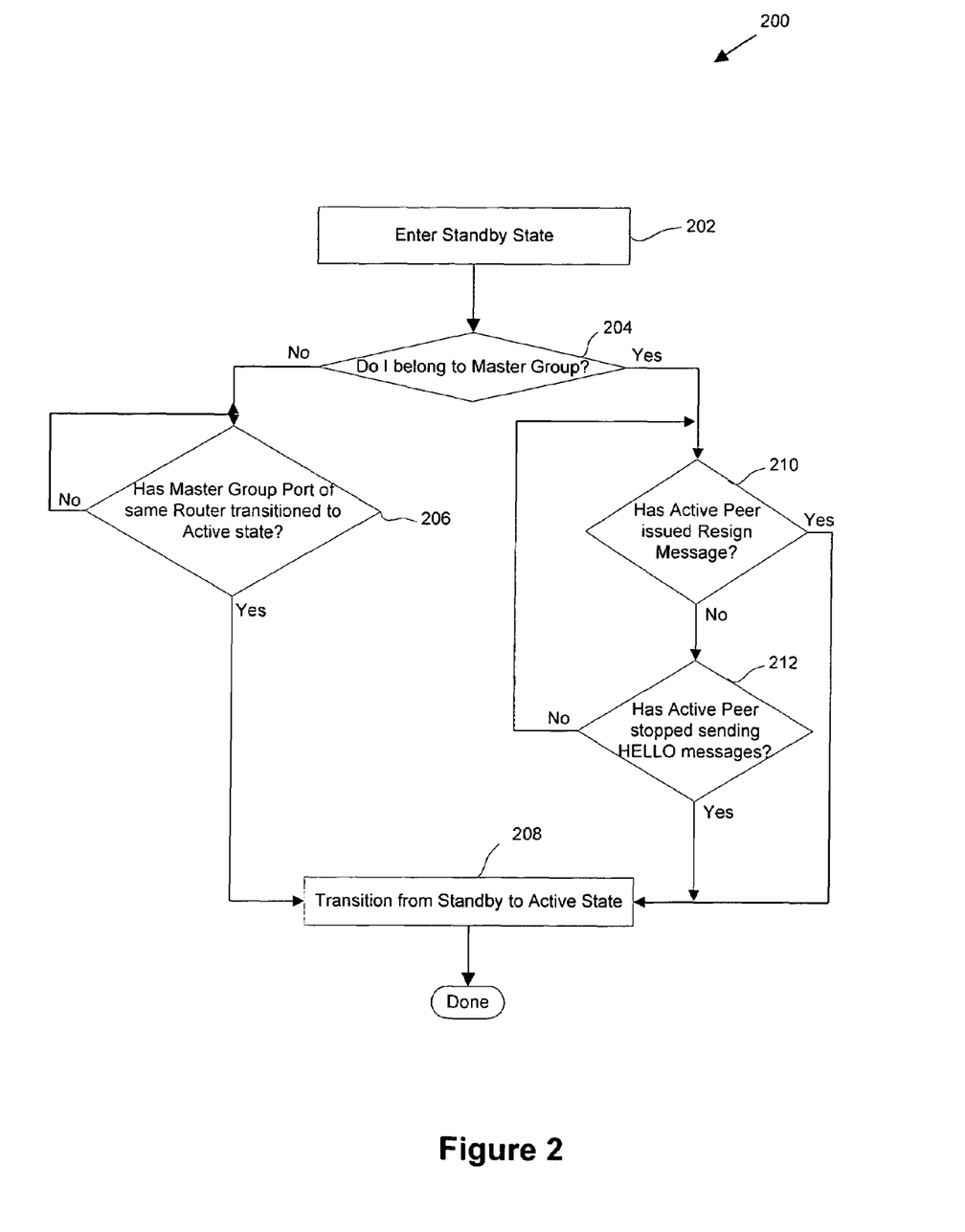
FIG. 2 presents a process flow diagram showing the conditions under which a standby router takes over when an active router leaves its standby group in accordance with one embodiment of the present invention.
Figure 3:
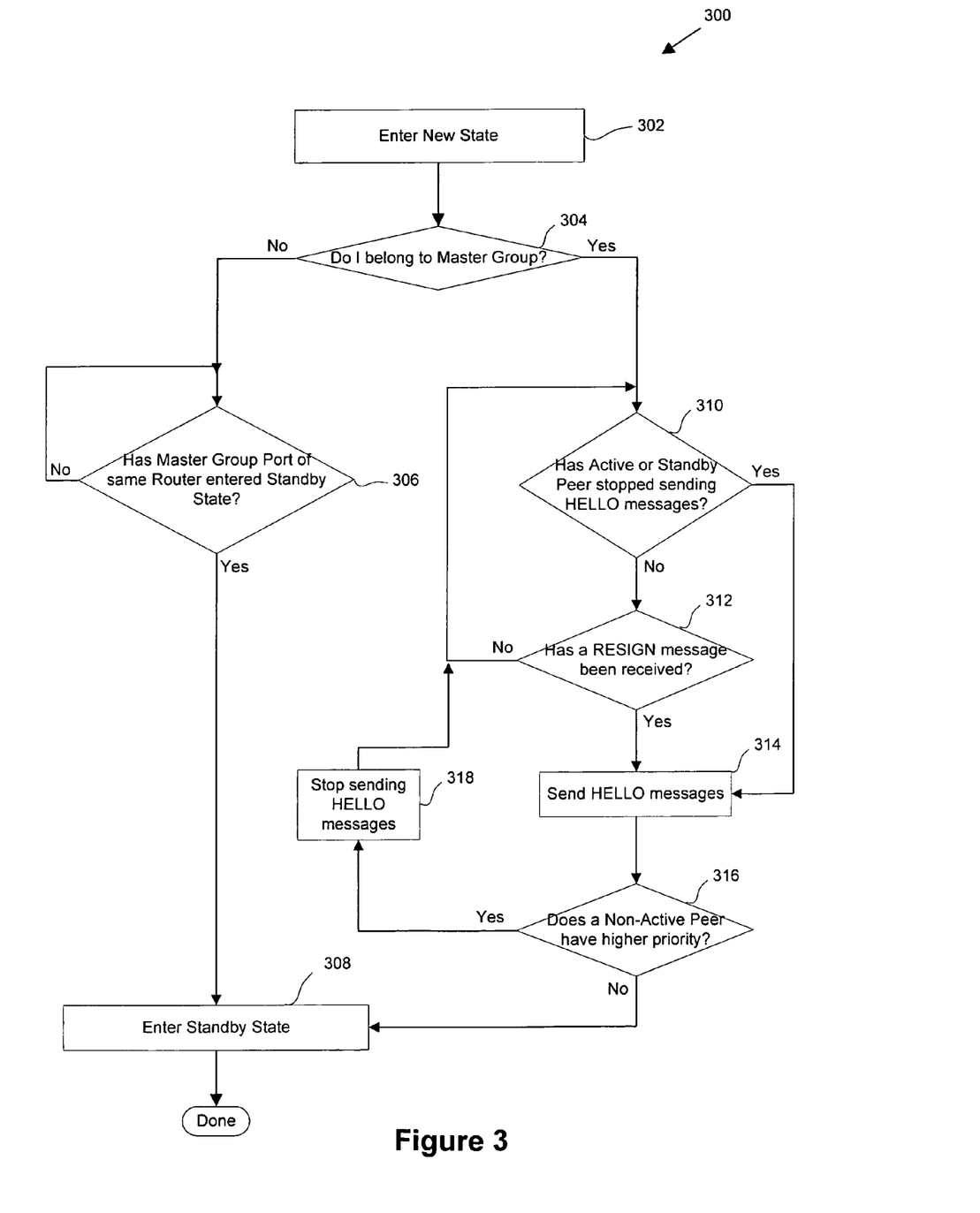
FIG. 3 shows how a router in the new state can take over for a standby router which have left its post in the standby group in accordance with one embodiment of the present invention.

Two important events in this invention are detailed in the flow charts of FIGS. 2 and 3. The first of these involves a standby router taking over for an active router which has left its standby group for some reason. The second of these involves a new router taking over for a standby router which has assumed the role of designed router. In general, these state transitions are initiated by the master group virtual ports of the relevant routers. It should be understood that these flow diagrams as well as the others presented herein are provided as convenient representations to aid in understanding the state transitions of router used in this invention. Some of the flow diagrams are organized in a manner that could imply that the system checks for certain actions by event loops or polling. No such limitation is intended. Thus, the process flow charts presented herein should not be read to imply that the system necessarily checks for events in the order listed.

FIG. 2 presents a process flow diagram showing the conditions under which a standby router takes over when an active router leaves its standby group in accordance with one embodiment of the present invention. Each virtual port of the standby router implements a similar flow. That is, the flow of FIG. 2 illustrates how each virtual port of the standby router transitions from a standby to an active state, depending on whether the virtual port belongs to the master peer group or the Client peer group.

It should be understood that a standby router can become active under other circumstances (i.e., receipt of a lower priority hello from the current active router when the standby router is configured to preempt). For purposes of FIG. 2, however, it is assumed that the active router has left without provocation from another router. Other cases are further discussed in U.S. Pat. No. 5,473,599 Issued 5 Dec. 1995 by Li et al., which patent is incorporated herein by reference in its entirety. Referring to FIG. 2, the virtual port under consideration first enters the standby state in operation 202. This standby state may have occurred under any suitable conditions as further described below. In the example of FIG. 1, the virtual ports of router 106 are in the standby state (S). Thus, only the virtual ports of router 106 would implement the flow of FIG. 2 which is initialized by entering the standby state.

The standby virtual port under consideration then determines whether it belongs to the master group in operation 204. This designation may be preconfigured or dynamically assigned. In the example of FIG. 1, VP1(M)(S) of router 106 is designated as belonging to the master group and being in standby state, while VP2(C)(S) and VP3(C)(S) are designated as belonging to the Client group and being in standby state. Consequently, only VP1(C)(S) of router 106 determines that it belongs to the master group and proceeds to then determines whether the current active router has issued a resign message in a decision operation 210. If not, VP1(M)(S) of router 106 then determines whether the active router has stopped sending hello messages in a operation 212. As long as decision operations 210 and 212 are answered in the negative, the standby router continues to await an event in which one of these decisions can be answered in the affirmative. When that happens, VP1(M)(S) of router 106 transitions from the standby to the active state in a operation 208 (now designated as VP1(M)(A) of router 106). Thereafter, the process ends.

In contrast, the virtual ports that are in a standby state and also belong to the Client group determine, of course, that they do not belong to the master group in operation 204. Instead of then determining whether to transition to the active state, the Client group virtual port determines whether the master group virtual port from the same router has transitioned to the active state in operation 206. This determination may be accomplished in any suitable manner. In one implementation, the state of the virtual port belonging the master group is recorded so that the Client group ports can then determine when the transition of the master group port occurs. Referring to FIG. 1, VP1(M)(S) of router 106 will transition to active state when either its Active peer VP1(M)(A) of router 102 sends a resign message or stops sending hello messages. This transition is recorded and detected by the other client ports VP2(C)(S) and VP3(C)(S) of router 106, which then themselves transition to the active state in operation 208 (now designated as VP2(C)(A) and VP3(C)(A) of router 106). The procedure then ends for the virtual port from the Client group.

In sum, when the virtual ports of a router are in standby state, the ports belonging to the Client group simply wait for the port belonging to the master group to transition. When or after the master group port transitions, the other Client group ports transition. That is, each Client group port's transition is triggered by the master group port's transition.

FIG. 3 shows how a router in the new state can take over for a standby router which have left its post in the standby group in accordance with one embodiment of the present invention. Initially, a virtual port enters the new state in operation 302. In general, each virtual port of a router that is in a new state implements the flow of FIG. 3 so that they all transition to a standby state when the standby peers of another router have relinquished their standby roles. The standby peers could be asked to relinquish their post by another peer, but that situation will not be addressed here. Next, the new virtual port under consideration then determines whether it belongs to the master group in operation 304.

If the new virtual port determines that it belongs to the master group, the new virtual port of the master group then determines whether the active or standby peers have stopped sending hello messages in operation 310. If not, the new virtual port of the master group determines whether it has received a resign message in operation 312. The new virtual port of the master group continues asking the questions posed in operations 310 and 312 until one is answered in the affirmative. At that point, the new virtual port of the master group begins sending its own hello messages at operation 314. Thereafter in a decision operation 316, the new virtual port of the master group determines whether any non-active peer which is currently speaking has a higher priority than its own. If not, the new virtual port of the master group transitions to the standby state at operation 308 and the process is concluded. If, on the other hand, decision operation 316 is answered in the negative, the new virtual port of the master group stops sending hello messages at operation 318 and the process control returns to decision operation 310.

The new virtual port(s) of the Client group does not itself determine whether to transition to a standby state. For example, operations 310 through 316 may be skipped for new virtual port(s) of the Client group. Instead, the new virtual port(s) of the Client group determine whether the master group port of the same router has transitioned to the standby state in operation 306. If such a transition has occurred, the new virtual port(s) of the Client group also transitions to the standby state in operation 308. Otherwise, the new virtual port(s) of the Client group merely wait for such transition.

The above discussion of FIG. 3 assumes that only the standby virtual ports will need to be replaced. Normally, when the active virtual ports of the active router stop sending hello messages, the standby virtual ports of the standby router will take over after the hold time expires. They then may begin sending their own hello messages (as active ports) before the next hold time for the active virtual ports expires. Thus, the new virtual ports recognize that they are not to take over for the previous active ports. However, if both the active and standby virtual ports have left their posts, then the new virtual port of the master group with the highest priority will actually take over the role of active virtual port. The process is essentially identical to that outlined in FIG. 3, except that the new virtual port assumes the role of active virtual port after first assuming the role of standby at operation 308.

The abrupt departure of active or standby virtual ports from the network group without first issuing a resign message may be noted by the other virtual peers in the system by the absence of a hello message. Normally, the active and standby virtual ports send periodic hello messages—once every predefined "hellotime." However, as indicated in FIG. 3, a new virtual port of the master group which has not discovered an active peer within "holdtime" may also send hello messages. That is, when a new virtual port does not hear a hello message from a standby and/or active peer within a predefined period known as a "holdtime," the new virtual port begins sending its own hello messages. In a preferred embodiment, the default hellotime is between about 1 and 3 seconds and the default holdtime is between about 3 and 10 seconds. Typically, the hold time is at least three times the hello time. All peers in the same group may use the same hellotime which may be specifically configured by a user. In a preferred embodiment, all hello messages are sent using the all-routers IP multicast address 224.0.0.2. The source address of the hello message is the router's primary IP address, and not the group's active IP addresses.

In addition to source address, the hello message contains the following items:
  The active IP address
  The hello time
  The hold time
  The routers priority
  The routers status (active, standby, new)
  Authentication
  A version number
  A group number The authentication is the same for each virtual port in the group and is provided as a password to ensure that the routers in the system get their information regarding hellotime, holdtime, dynamic IP address, etc. from a packet issued by a peer within their group. The version number represents the implementation of the standby protocol. The group number represents the standby group which issued the hello message.

As explained, when a non-active virtual port of the master group on the network does not hear a hello from the active peer within a holdtime, it may take steps to change its status. In the case of a current standby virtual port, if it sees the hold time expire on the active peer, it immediately assumes the active role. In the case of a new virtual port of the master group, if it sees the hold time expire on the standby peer, it then sends a hello message (i.e., it enters "speak" state). If within another hold time, no other peers other than the resigned peer send a hello message of higher priority, then the new virtual port of the master group assumes the status of standby. If, on the other hand, while sending hello messages, a given new virtual port receives a hello message of higher priority from another new peer, then the given new peer stops sending hello messages and becomes ineligible to take over the standby role (at least temporarily).

An active router which decides to leave the network should first send a resign message so that the standby router can take over smoothly. Only the active router is permitted to send a resign message. In response to a resign message, the standby router automatically becomes the active router. In response to the same resign message, the new routers' virtual ports belonging to the master group may begin sending hellos as part of an election to see which one of them takes over the standby role. If a given virtual port hears no hello messages of higher priority than his own within a hold time, that virtual port takes over the standby role. The resign message includes all information found in the hello messages, but only the status and authentication fields are particularly pertinent.

Routers may enter a standby group for various reasons such as having previously lost power or otherwise failed. As explained, there are two scenarios under which the reentering router may assume the role of active router within the standby group. Which of these scenarios is employed depends upon whether the incoming router is configured to "preempt" an active router. If it is, the entering router's virtual ports that belongs to the master group sends a coup message to the current active router when it believes it has priority over that router. After the coup message is received by the current active router, the priorities of the entering and active routers are compared. If the entering router has a higher priority, the virtual port of the master group from current active router resigns and the virtual port of the master group of the incoming router takes over. The Client group ports follow the master group ports in each router.

If an entering router is not configured to preempt, it can send no coup messages to the active router. However, it can take over the role of a resigned router indirectly. For example, it can first become a standby router by taking over for a failed standby router as described above. After the incoming router assumes standby status, it automatically takes over for the current active router when that router fails or resigns. These operations are, of course, initiated only by the virtual port of the router under consideration that belongs to the master group. The Client group ports then mimic the transition of the master group port.

Figure 4:
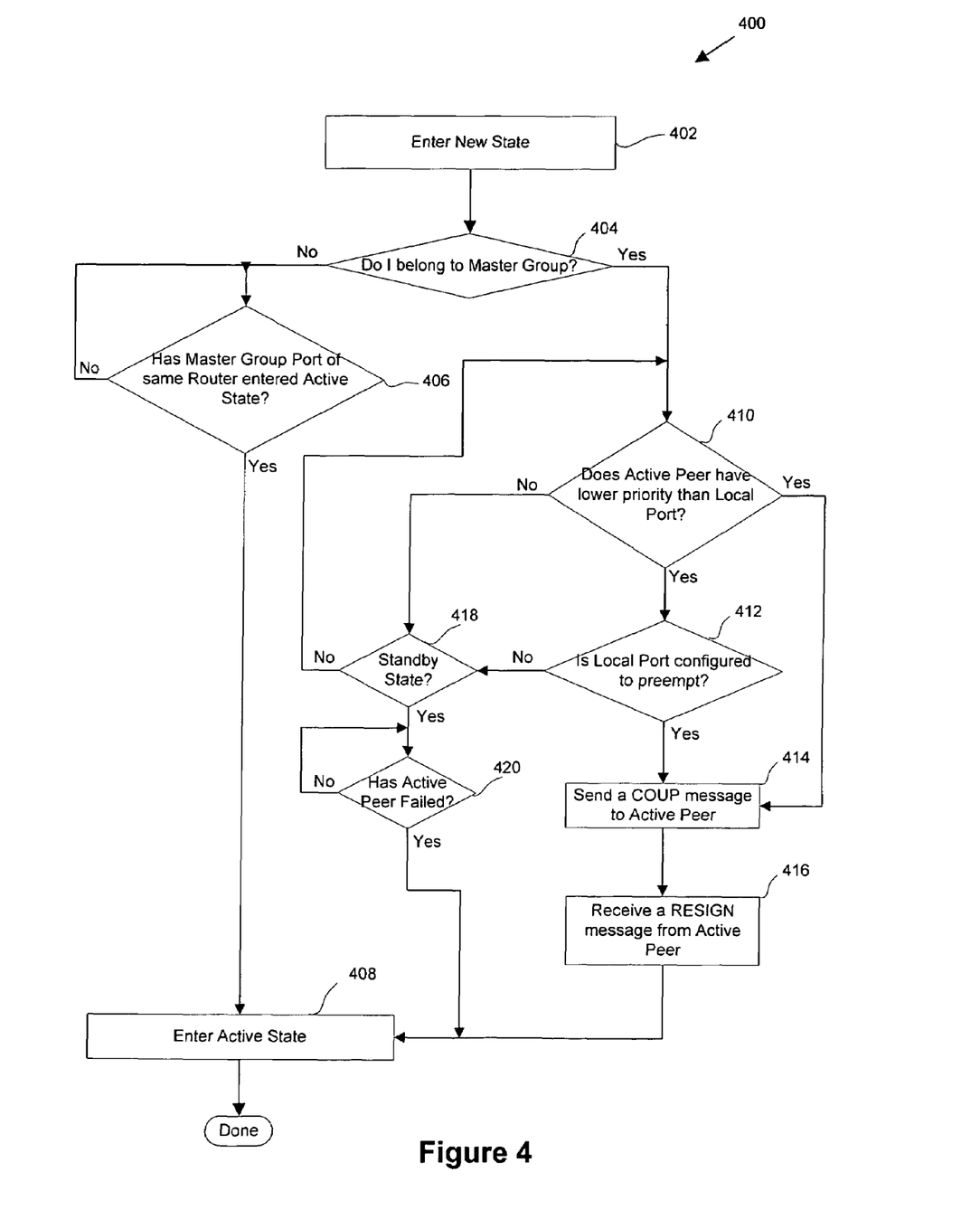
FIG. 4 is a process flow diagram presenting the processes by which a new router entering a network segment can become an active router in accordance with a specific implementation of this invention.

Some options available to a new router entering a standby group are detailed in FIG. 4. Initially, a virtual port of the entering router assumes the new state in operation 402. The new virtual port then determine whether it belongs to the master group in operation 404. If it instead belongs to the Client group, the virtual port waits for the master group Port to transition to the active state. When or after the master group port transitions to the active state, the Client group port also transitions to the active state in operation 408.

In contrast, the new virtual port belonging to the master group determines whether the active peer in its standby group has a lower priority than itself (preferably by analyzing hello messages from the active peer) in operation 410. If so, the new virtual port belonging to the master group then determines in a decision step 412 whether it is configured to preempt. If so, it sends coup message to the active peer at operation 414. It then receives a resign message from the active router at operation 416. Finally, it transitions to the active state at operation 408 and the process is completed.

The HSRP protocol also provides for the event in which a coup or resign message is lost or not received by the new virtual port. If a coup message is lost, there will simultaneously be two active ports. In such situations, the lower priority active virtual port (i.e., the original active port) will receive a hello message from the other active virtual port within the next hello time after the new virtual port belonging to the master group assumes active status. Upon receiving such hello message, the original active virtual port (of the master group) will immediately relinquish its active status and revert to new status. If a resign message from an active peer is lost, the other peers in the group will quickly determine that the active virtual port is no longer present by the absence of a hello message from the active virtual port. As explained, if no hello message is received from an active virtual port within a hold time, the other peers of the master group in the group take steps to fill the active role and, if necessary, standby role.

Returning again to FIG. 4, if either of decision steps 410 or 412 is answered in the negative, the new virtual port belonging to the master group determines whether it can enter the standby state at a decision operation 418. It can enter the standby state by waiting for the current standby router to leave the group or assume active status as detailed in FIG. 3. Alternatively, the new virtual port belonging to the master group can listen for hello messages from the standby peer and then compare priorities. If the standby peer has a lower priority, the new virtual port belonging to the master group sends its own hello message to let the standby peer know that it should relinquish its role. Assuming that the new virtual port belonging to the master group can not yet enter the standby state (i.e., decision operation 418 is answered in the negative), the new virtual port belonging to the master group simply waits until an active peer with a lower priority takes over or the new virtual port belonging to the master group itself can assume the standby role. That is, either decision operation 410 or 412 is answered in the affirmative. Assuming that decision operation 418 is answered in the affirmative, the new virtual port belonging to the master group determines whether the currently active peer has failed or resigned at decision operation 420. This is detailed in FIG. 2. When such event occurs, the new virtual port of the master group transitions to the active state at operation 408 (i.e., decision operation 420 has been answered in the affirmative).

The procedure for determining the active peer's priority (operation 410) may involve first listening for a hello message issued by the active peer. When such a hello message is received, the new (listening) virtual port of the master group checks the priority in that message against its own priority. If the new virtual port belonging to the master group determines that it has a higher priority than the active peer and it is configured to preempt, the new virtual port belonging to the master group immediately broadcasts a coup message to the active peer. The coup message includes the same fields as contained in the hello message, but only the priority, status, and authentication fields are particularly pertinent.

From the master group active virtual port's standpoint, when it receives an acceptable coup message (i.e., one from a peer having a higher priority than it own) it resigns from the status of active. This involves removing the group MAC address from its address filter and then unicasting a resign message to the sender of the coup message. The active virtual port then returns to the new state. If the resign message would be broadcast rather than be unicast, the standby peer—as well as the port sending the coup message—would transition to active state.

For each VLAN router group, the election of a standby virtual port and/or active virtual port has taken place after a "trigger event" such as a failure of the active virtual port or the standby virtual port. The term "trigger event" as used herein means an event that has traditionally required changes to a redundancy group and the operating mode(s) of one or more members of such a group, including but not limited to, failure of the active virtual port and failure of the standby virtual port. Such trigger events still require the election of a standby virtual port and/or active virtual port to maintain the proper functioning of the redundancy group. The election of the active virtual port and standby virtual port can be based on pre-configured priorities. That is, each router or gateway device and its associated virtual ports are pre-programmed with a priority (for example, a numerical priority value) that is then used in electing an active virtual port or standby virtual port. Alternatively, mechanisms for dynamically assigning priorities based on changing conditions may be implemented as further described in U.S. patent application Ser. No. 10/151,798, entitled "Standby Router Protocol Using Optimal Router Metric", filed 20 May 2002 by Ian H. Wilson, which application is incorporated herein by reference in its entirety. In general, the active virtual port is elected based, at least in part, on the corresponding device's current relative connectivity to a remote network or other destination outside the gateway's LAN as measured (at least in part) by the device's current route metric to the remote network.

Generally, the techniques for implementing the present invention may be implemented on software and/or hardware. For example, these techniques can be implemented in an operating system kernel, in a separate user process, in a library package bound into network applications, on a specially constructed machine, or on a network interface card. In a specific embodiment of this invention, the techniques of the present invention are implemented in software such as an operating system or in an application running on an operating system.

A software or software/hardware hybrid packet processing system of this invention is preferably implemented on a general-purpose programmable machine selectively activated or reconfigured by a computer program stored in memory. Such programmable machine may be a network device designed to handle network traffic. Such network devices typically have multiple network interfaces including frame relay and ISDN interfaces, for example. Specific examples of such network devices include routers and switches. For example, the packet processing systems of this invention may be specially configured routers such as specially configured router models 1600, 2500, 2600, 3600, 4500, 4700, 7200, 7500, and 12000 available from Cisco Systems, Inc. of San Jose, Calif. A general architecture for some of these machines will appear from the description given below. In an alternative embodiment, the system may be implemented on a general-purpose network host machine such as a personal computer or workstation. Further, the invention may be at least partially implemented on a card (for example, an interface card) for a network device or a general-purpose computing device.

Figure 5:
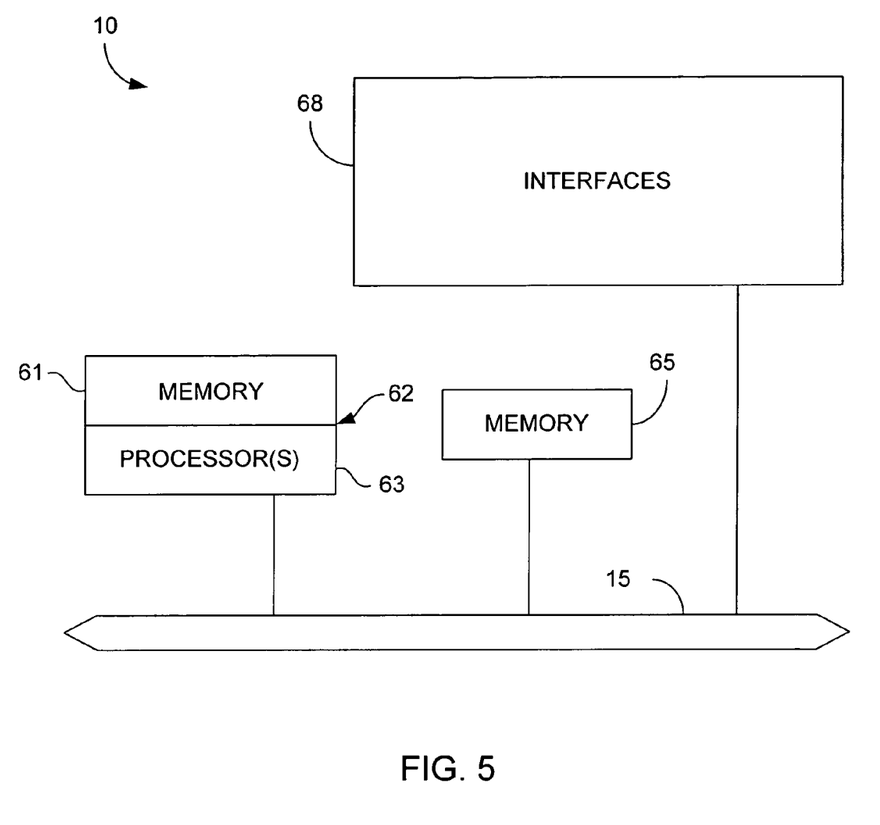
FIG. 5 is a block diagram of a router that may be used to implement embodiments of this invention.

Referring now to FIG. 5, a router 10 suitable for implementing embodiments of the present invention includes a master central processing unit (CPU) 62, interfaces 68, and a bus 15 (for example, a PCI bus). When acting under the control of appropriate software or firmware, the CPU 62 is responsible for such router tasks as routing table computations and network management. It may also be responsible for calculating a route metric and/or comparing two route metrics to determine which has higher priority. It preferably accomplishes all these functions under the control of software including an operating system (for example, the Internetwork Operating System (IOS®) of Cisco Systems, Inc.) and any appropriate applications software. CPU 62 may include one or more processors 63 such as a processor from the Motorola family of microprocessors or the MIPS family of microprocessors. In an alternative embodiment, processor 63 is specially designed hardware for controlling the operations of router 10. In a specific embodiment, a memory 61 (such as non-volatile RAM and/or ROM) also forms part of CPU 62. However, there are many different ways in which memory could be coupled to the system. Memory block 61 may be used for a variety of purposes such as, for example, caching and/or storing data, programming instructions, etc.

The interfaces 68 are typically provided as interface cards (sometimes referred to as "line cards"). Generally, they control the sending and receiving of data packets or data segments over the network and sometimes support other peripherals used with the router 10. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 62 to efficiently perform routing computations, network diagnostics, security functions, etc.

Although the system shown in FIG. 5 is one specific router of the present invention, it is by no means the only router architecture on which the present invention can be implemented. For example, an architecture having a single processor that handles communications as well as routing computations, etc. is often used. Further, other types of interfaces and media could also be used with the router.

Regardless of a network device's configuration, it may employ one or more memories or memory modules (such as, for example, memory block 65) configured to store data, program instructions for the general-purpose network operations and/or the inventive techniques described herein. The program instructions may control the operation of an operating system and/or one or more applications, for example. The memory or memories may also be configured to store received packets, identifiers to track each flow and the number of such flows, VLAN associations, states of each virtual ports, etc.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks and DVDs; magneto-optical media such as floptical disks; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. For example, client virtual ports may send periodic messages to refresh their virtual MAC addresses in switches and learning bridges. These refresh messages may be sent at a much lower frequency than the election messages sent by the master virtual ports. For example, refresh messages may be sent about every 120 seconds. However, if the virtual MAC address is the same as the interface MAC address, then there is not need to send such refresh messages. Additionally, client ports may have the same or different group identifiers (e.g., group numbers) as the master ports although having different group identifiers works well. Therefore, the described embodiments should be taken as illustrative and not restrictive, and the invention should not be limited to the details given herein but should be defined by the following claims and their full scope of equivalents.

What is claimed is:

1. A method implemented in a router for transitioning between states for use in a redundant router group, the method comprising:

providing a plurality of virtual ports in a router, wherein the virtual ports include a master virtual port and one or more client virtual ports, wherein the master virtual port belongs to a same master group as one or more master virtual peers that are each provided at a different other router and each client virtual port belongs to a same client group as one or more client virtual peers provided at one or more other routers;

initiating a selected one of the transitions after occurrence of an event, wherein the initiating of the selected transition is performed only with respect to the master virtual port and the one or more master virtual peers; and when a selected one of the transitions is initiated with respect to the master virtual port of the router, mimicking the selected transition with respect to the one or more client virtual port(s) of the router.

2. A method as recited in claim 1, wherein initiating a selected one of the transitions after occurrence of an event is accomplished by transitioning the master virtual port from a standby state to an active state after it is determined that either an active peer of the one or more master virtual peers issues a resign message or stops sending hello messages.

3. A method as recited in claim 1, wherein initiating a selected one of the transitions after occurrence of an event is accomplished by transitioning the master virtual port from a new state to a standby state after it is determined that an active or standby peer of the one or more master virtual peers is continuing to send hello messages, a resign message has been received, and a non-active peer of the one or more master virtual peers does not have a higher priority.

4. A method as recited in claim 3, further comprising sending hello messages from the master virtual port after it is determined that an active or standby peer of the one or more master virtual peers has stopped sending hello messages and a resign message has been received.

5. A method as recited in claim 4, further comprising stopping the sending of hello messages from the master virtual port when it is determined that a non-active peer of the one or more master virtual peers has a higher priority.

6. A method as recited in claim 1, wherein initiating a selected one of the transitions after occurrence of an event is accomplished by transitioning the master virtual port from a new state to an active state after it is determined that an active peer of the one or more master virtual peers has a lower priority than the router and the router is configured to preempt, wherein the transitioning occurs after a coup message is sent and a resign message is received from the active peer of the one or more master virtual peers.

7. A method as recited in claim 1, wherein initiating a selected one of the transitions after occurrence of an event is accomplished by transitioning the master virtual port from a new state to an active state after it is determined that (i) an active peer of the one or more master virtual peers has a lower priority than the router, (ii) the router is not configured to preempt, (iii) a standby state has been reached, and (iv) an active peer of the one or more master virtual peers has failed.

8. A router operable to transition between states for use in a redundant router group, the router comprising:

one or more processors;

one or more memory, wherein at least one of the processors and memory are configured for:

providing a plurality of virtual ports in a router, wherein the virtual ports include a master virtual port and one or more client virtual ports, wherein the master virtual port belongs to a same master group as one or more master virtual peers that are each provided at a different other router and each client virtual port belongs to a same client group as one or more client virtual peers provided at one or more other routers;

initiating a selected one of the transitions after occurrence of an event, wherein the initiating of the selected transition is performed only with respect to the master virtual port and the one or more master virtual peers; and when a selected one of the transitions is initiated with respect to the master virtual port of the router, mimicking the selected transition with respect to the one or more client virtual port(s) of the router.

9. A router as recited in claim 8, wherein initiating a selected one of the transitions after occurrence of an event is accomplished by transitioning the master virtual port from a standby state to an active state after it is determined that either an active peer of the one or more master virtual peers issues a resign message or stops sending hello messages.

10. A router as recited in claim 8, wherein initiating a selected one of the transitions after occurrence of an event is accomplished by transitioning the master virtual port from a new state to a standby state after it is determined that an active or standby peer of the one or more master virtual peers is continuing to send hello messages, a resign message has been received, and a non-active peer of the one or more master virtual peers does not have a higher priority.

11. A router as recited in claim 10, wherein the at least one of the processors and memory are further adapted for sending hello messages from the master virtual port after it is determined that an active or standby peer of the one or more master virtual peers has stopped sending hello messages and a resign message has been received.

12. A router as recited in claim 11, wherein the at least one of the processors and memory are further adapted for stopping the sending of hello messages from the master virtual port when it is determined that a non-active peer of the one or more master virtual peers has a higher priority.

13. A router as recited in claim 8, wherein initiating a selected one of the transitions after occurrence of an event is accomplished by transitioning the master virtual port from a new state to an active state after it is determined that an active peer of the one or more master virtual peers has a lower priority than the router and the router is configured to preempt, wherein the transitioning occurs after a coup message is sent and a resign message is received from the active peer of the one or more master virtual peers.

14. A router as recited in claim 8, wherein initiating a selected one of the transitions after occurrence of an event is accomplished by transitioning the master virtual port from a new state to an active state after it is determined that (i) an active peer of the one or more master virtual peers has a lower priority than the router, (ii) the router is not configured to preempt, (iii) a standby state has been reached, and (iv) an active peer of the one or more master virtual peers has failed.

15. A network segment providing a redundant routing capability, the network segment comprising:
a first host on a first virtual local area network (VLAN), said host being configured to address data packets to a virtual router;
a second host on a second virtual local area network (VLAN), said host being configured to address data packets to the virtual router; and
at least two physical routers connecting the first and second hosts' VLAN's to at least one other network segment, each router including a first virtual port for communicating with the first host and a second virtual port for communicating with the second host, wherein only the first virtual ports of the two or more physical routers are configured to initiate transitioning between the states of active and standby while the second virtual ports mimic such transition when the first virtual ports of the two or more physical routers all belong to a master group and the second virtual ports do not belong to such master group, and wherein only the second virtual ports of the two or more physical routers are configured to initiate transitioning between the states of active and standby while the first virtual ports mimic such transition when the second virtual ports of the two or more physical routers all belong to a same master group and the first virtual ports do not belong to such master group.

16. A network segment as recited in claim 15, wherein each virtual port of each router is configured for:
transitioning from a standby state to an active state after it is determined that the each virtual port is a master port of the master group and after it is determined that either an active peer of the master group issues a resign message or stops sending hello messages;
transitioning from a standby state to an active state after it is determined that the master port of the master group from the same router has transitioned from a standby state to an active state;
transitioning from a new state to a standby state after it is determined that the each virtual port is a master port of the master group and after it is determined that an active or standby peer of the master group has stopped sending hello messages, a resign message has been received, and a non-active peer of the master group does not have a higher priority;
transitioning from a new state to a standby state after it is determined that the master port of the master group from the same router has transitioned from a new state to a standby state;
transitioning from a new state to an active state after it is determined that the each virtual port is a master port of the master group and after it is determined that an active peer of the master group has a lower priority than the router and the router is configured to preempt, wherein the transitioning occurs after a coup message is sent and a resign message is received from the active peer of the master group; and
transitioning from a new state to an active state after it is determined that the master port of the master group from the same router has transitioned from a new state to an active state.

17. A network segment as recited in claim 16, wherein each virtual port is further configured for sending hello messages after it is determined that an active or standby peer of the master group has stopped sending hello messages and a resign message has been received and the each virtual port is a master port of the master group.

18. A network segment as recited in claim 17, wherein each virtual port is further configured for stopping the sending of hello messages when it is determined that a non-active peer of the master group has a higher priority and the each virtual port is a master port of the master group.

19. A network segment as recited in claim 17, wherein each virtual port of each router is configured for transitioning from a new state to an active state after it is determined that the each virtual port is a master port of the master group and it is determined that (i) an active peer of the master group has a lower priority than the router, (ii) the router is not configured to preempt, (iii) a standby state has been reached, and (iv) an active peer of the master group has failed.

20. A method for providing a redundant routing capability for a plurality of routers that each have a plurality of virtual ports, the method comprising for each virtual port of each router:
transitioning from a standby state to an active state after it is determined that the each virtual port is a master port that belongs to a same master group as one or more master virtual peers and after it is determined that either an active peer of the one or more master virtual peers issues a resign message or stops sending hello messages;

transitioning from a standby state to an active state after it is determined that the each virtual port is not a master port and the master port, which is provided at a same router as the each virtual port and belongs to a same master group as one or more master virtual peers that are each provided at a different other router, has transitioned from a standby state to an active state;

transitioning from a new state to a standby state after it is determined that the each virtual port is a master port that belongs to a same master group as one or more master virtual peers and after it is determined that an active or standby peer of the one or more master virtual peers has stopped sending hello messages, a resign message has been received, and a non-active peer of the one or more master virtual peers does not have a higher priority;

transitioning from a new state to a standby state after it is determined that the each virtual port is not a master port and the master port, which is provided at a same router as the each virtual port and belongs to a same master group as one or more master virtual peers that are each provided at a different other router, has transitioned from a new state to a standby state;

transitioning from a new state to an active state after it is determined that the each virtual port is a master port that belongs to a same master group as one or more master virtual peers and after it is determined that an active peer of the one or more master virtual peers has a lower priority than the each router and the each router is configured to preempt, wherein the transitioning occurs after a coup message is sent and a resign message is received from the active peer of the one or more master virtual peers; and transitioning from a new state to an active state after it is determined that the each virtual port is not a master port and the master port, which is provided at a same router as the each virtual port and belongs to a same master group as one or more master virtual peers that are each provided at a different other router, has transitioned from a new state to an active state.

21. An apparatus for transitioning between states for use in a redundant router group, the apparatus comprising:

means for providing a plurality of virtual ports in a router, wherein the virtual ports include a master virtual port and one or more client virtual ports, wherein the master virtual port belongs to a same master group as one or more master virtual peers that are each provided at a different other router and each client virtual port belongs to a same client group as one or more client virtual peers provided at one or more other routers;

means for initiating a selected one of the transitions after occurrence of an event, wherein the initiating of the selected transition is performed only with respect to the master virtual port and the one or more master virtual peers; and means for mimicking the selected transition with respect to the one or more client virtual port(s) of the router when a selected one of the transitions is initiated with respect to the master virtual port of the router.

* * * * *